Dec. 7, 1943.  A. JUNG ET AL  2,335,944
PROTECTIVE AND AUXILIARY LAYERS OF ALL
KINDS FOR PHOTOGRAPHIC MATERIAL
Filed March 14, 1942

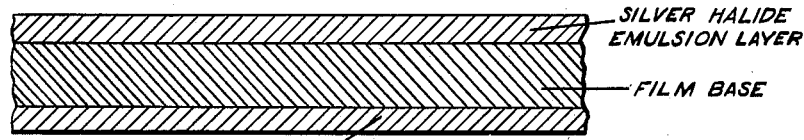

SILVER HALIDE
EMULSION LAYER

FILM BASE

BACKING LAYER OF THE CONDENSATION
OF HYDROLYZED ACETYL CELLULOSE
WITH THE MONO ETHYL ESTER OF
$\alpha$-$\beta$-$\gamma$-$\delta$ TETRA CARBOXYLIC ACID

*Inventors*
ADOLF JUNG AND GUSTAV WILMANNS
By Henry W. Coughlin
*Attorney*

Patented Dec. 7, 1943

2,335,944

UNITED STATES PATENT OFFICE 2,335,944

PROTECTIVE AND AUXILIARY LAYERS OF ALL KINDS FOR PHOTOGRAPHIC MATERIAL

Adolf Jung, Dessau, and Gustav Wilmanns, Schoneberg, near Kronberg in Taunus, Germany, assignors to General Aniline & Film Corporation, New York, N. Y., a corporation of Delaware Application March 14, 1942, Serial No. 434,784
In Germany February 27, 1939

4 Claims. (Cl. 95—9)

This invention relates to protective and auxiliary layers of all kinds for photographic material.

It is an object of this invention to provide protective and auxiliary layers for photographic material consisting of cellulose esters of a special type.

It is a further object to provide protective and auxiliary layers for photographic material containing esters of tri- and polybasic acids with cellulose and its derivatives.

Other objects will become apparent from the examples and details following hereinafter.

It is known that photographic material, for instance, photographic films, plates and papers possess mostly, besides the light sensitive emulsion and its support, also protective and auxiliary layers, in order to avoid halation effects, statics etc. For that purpose water-soluble cellulose esters for example, water soluble dicarboxylic acid esters of the cellulose and water-soluble salts of such esters, have been suggested.

Much more suitable, however, for that purpose are cellulose derivatives consisting of cellulose esters of polybasic acids with three and more carboxyl groups. According to the general experience in cellulose chemistry only one acid group at a time enters into the cellulose molecule, even when reacting with di- and polybasic acids. In the case of dicarboxylic acids, for instance, there is only one carboxylic group available for further chemical alterations, such as esterification or salt formation. With acids possessing three or more carboxylic groups, these alterations may be varied to a greater extent and it is possible to adjust the properties of the cellulose ester for each purpose as to fully meet all requirements of the case.

In a tricarboxylic acid there are still two, in a tetracarboxylic acid still three carboxylic groups uncombined. The carboxylic groups, for instance, may be saturated wholly or partly by the same or different inorganic or organic bases, they may be transformed into mixed inorganic or organic salts, they may be esterified wholly or partly by alcohol, phenol etc. They are also capable of forming ester salts. The formation of salts and esters may also be effected by sulfo groups or phenolic hydroxyl groups.

The esters from polycarboxylic acids and cellulose may be prepared by reacting the acids or anhydrides thereof with hydrolyzed acetyl cellulose dissolved in a swelling agent as, for instance, dichloroethylphosphate at 80 to 100° C. for some hours and then precipitating the reaction product with water or ether whereupon it is washed and dried. For accelerating the esterification a little pyridine may be added thereto.

The described transformability of the properties of the cellulose esters with acids of three and more carboxylic groups is very desirable, since till now it was quite impossible to meet all requirements for backing layers, intermediate layers, emulsion coatings, antihalo backings and antistatic protective layers for photographic material with the cellulose derivatives used heretofore. In applying a cellulose compound as antistatic backing layer, for instance, it is not sufficient that the cellulose compound is able at low atmospheric humidity to shunt electric currents of several thousand volts. The compound must also be soluble in suitable solvents to make it adhere sufficiently to the nitro and acetyl cellulose support of a motion picture film. On the other hand the cellulose esters must not penetrate so far into the film base that the electric conductivity is greatly reduced. The solvents applied should not swell the film base too much and should not harmfully influence the flatness of the film and the photographic emulsion. Also the boiling point of the solvents must be low in order to remove them quickly in the drying process. The cellulose compound must be sufficiently scratch proof and must possess excellent sliding properties. The cellulose compound should furthermore be soluble in about the same solvents as the film base and must be easily removable so as not to hinder the re-use of the film base. If the cellulose compounds are used as carriers of antihalo dyestuffs, new requirements must be met with regard to decoloration, compatibility with dyestuffs etc. All the properties described could not be combined up till now in one cellulose derivative. A compromise had to be made in favor of a preferred property, for example, the electric conductivity or the surface hardness. In applying cellulose esters of tri-basic and higher acids a raw material is provided of such a wide variability that it can be adjusted closely to every special purpose.

As acid components of the cellulose esters to be used the following may be mentioned: aconitic acid, propanetricarboxylic acid, 1-2-4-butanetricarboxylic acid, ethylenetetracarboxylic acid, pentanetetracarboxylic acid, pentanepentacarboxylic acid, mellitic acid. In the examples described hereinafter still others are named. Either single of mixed cellulose esters of any esterification degree may be employed, the latter being preferably esterified together with low saturated or unsaturated aliphatic acids or with aromatic substituted carboxylic acids. Also mixed esterification with other tri- or higher basic carboxylic acid esters of cellulose ethers, like methyl-, ethyl-, ethoxy- or benzyl cellulose or cellulose ether acids, like cellulose glycolic acid are suitable.

The polybasic acid esters of the cellulose and their compounds are applied in the form of the free acids, the neutral or acid esters or ester salts. If they are acid they are generally not water-soluble, but dissolve readily in the photographic baths since they become completely water-soluble by further salt formation of the free acid groups. It is therefore possible to produce from such acid cellulose ester salts protective layers for photographic material, which on the one hand are not water-soluble or water-sensitive (important for the keeping quality of the films especially in the tropics) but on the other hand are dissolved and removed completely in the photographic baths during development.

Layers of the described material may be employed also for the mechanical protection of the films. In such a case the cellulose ester acids instead of the acid salts are best used.

Layers consisting of acid salts are especially suitable as antistatics, as they possess very good electric conductivity and have no or only very little tendency to charge up electrically. Needless to say that by adding suitable dyestuffs to the various layers still additional antihalo protection may be secured. As it is possible to esterify dyestuffs with cellulose and cellulose esters, for example, pyrazolone derivatives and azo dyestuffs containing three or more carboxyl groups or instead of the carboxyl groups sulfo or phenyl groups, these substances serve directly as antihalo and antistatic layers. In the hot and humid climate they do not influence the properties of the film and are completely removed during development by dissolving in the photographic baths.

The new protective and auxiliary layers are applied to the usual photographic and cinematographic films comprising a support and at least one light sensitive silver halide emulsion layer in the same way as the auxiliary layers known heretofore, viz, as a backing layer, an intermediate layer or as a protective layer on top of the emulsion layer. The invention is further illustrated by the accompanying self-explanatory drawing disclosing diagrammatically and in section a film having as a backing layer an esterification product according to the present invention.

Example 1

5 g. of an esterification product consisting of a hydrolyzed acetyl cellulose (containing 44% acetic acid) with the monoethylester anhydride of butane-α-β-γ-δ-tetracarboxylic acid (20% ester acid anhydride) are dissolved in a mixture of 800 cc. of 96% alcohol and 300 cc. of water and there are added about 8 cc. of n/2 sodium hydroxide solution.

A photographic film is coated by this solution with an antihalo backing and a protective layer cast on top of the emulsion. This layer prevents scratching and electric charges of the film.

The used esterification product is obtained in the following manner: From butanetetracarboxylic acid tetraethylester there is produced the monoethylester acid by partial saponification with the theoretical amount of methanolic potassium hydroxide solution whereupon the anhydride is prepared by boiling with acetic acid anhydride in excess. 400 g. of the anhydride are dissolved in 5.5 liters of trichloroethylphosphate. To the solution 80 cc. of piperidine are added. This solution obtained at 150° C. and then cooled to 85° C. is mixed with a solution of 100 g. of hydrolyzed acetyl cellulose in 2.2 liters of trichloroethylphosphate. The reaction mixture is kept at 85-90° C. with constant stirring for about 2-3 hours until a test portion precipitated with ether and washed with methanol dissolves in 2% sodium carbonate solution. The whole is then cooled. The esterification product is precipitated with ether and extracted with methanol.

Example 2

The condensation product consisting of 2 mols of abietic acid with 1 mol of maleic acid anhydride, a tricarboxylic acid, is esterified with a hydrolyzed acetyl cellulose (44% acetic acid). This cellulose ester acid contains 16% tricarboxylic acid.

The production of the condensation product from abietic acid and maleic acid anhydride is carried out in the manner as disclosed in German Patent 676,485 (cf. lines 40-52, page 2 and Examples 1 and 2). The tricarboxylic acid may also be prepared by saponifying the glycerol- or sorbitolesters obtained as described in Example 3 of the German patent.

5 g. of this cellulose ester acid are dissolved in 800 cc. of 96% alcohol and 300 cc. of water and partly neutralized with about 3 cc. of n/2 sodium hydroxide solution. The photographic film is coated by immersing in the solution or applying thereto the solution by means of a roll. The film may already be provided with a subbing or the subbing may be applied thereto on the one side and the protective layer made according to the invention on the other side of the film in the same step whereafter the subbing is coated with the emulsion. This treatment preserves the film from scratching and electric charges.

Example 3

In a coating solution prepared according to Example 1, 3 g. of Light Green (yellowish), Schultz-Tables No. 764 are dissolved.

The film backing obtained from this solution prevents halation, scratching and electric discharges.

Example 4

The back of a nitro cellulose film is coated in a known manner with 0.4% solution of the mixed cellulose ester with acetic acid and the 2-phenyl-1-3-4-butanetricarboxylic acid monomethyl ester in 80% aqueous alcohol. The backing obtained after evaporation of the solvent prevents extensively electric charges and scratching of the film.

The cellulose ether is prepared as follows: 2-phenyl-1.3.4-butanetricarboxylic acid monomethyl ester in trichloroethylphosphate as the solvent is caused to react with hydrolyzed acetyl cellulose in the presence of a little pyridine at 85° C. for about 3 hours until a test portion precipitated with ether dissolves in a diluted sodium carbonate solution. The reaction product is precipitated with ether, extracted with methanol and dried.

Example 5

5 g. of the esterification product from a hydrolyzed acetyl cellulose containing 44% of acetic acid and a mixture of maleic acid anhydride and α-β-γ-δ-butanetetracarboxylic acid anhydride monomethyl ester prepared in the proportion of 3:1 in the manner analogous to that disclosed in the foregoing examples, the precipitation being accomplished with water, are dissolved in a mixture of 800 cc. of 96% alcohol and 300 cc. of water and partially neutralized with about 3 cc. of n/2 sodium hydroxide solution. The back of a photographic film is treated with this solution. The layer obtained from this solution prevents electric charges and scratching.

*Example 6*

Hydrolyzed acetyl cellulose containing 44% of acetic acid is esterified with a mixture of the tricarboxylic acid prepared from abietic acid and maleic acid anhydride and of maleic acid anhydride in the proportion of 1:1, water being the precipitating agent. A mixture of 5 g. of this ester acid and 3 g. of Light Green (yellowish) is dissolved in 800 cc. of 96% alcohol and 300 cc. of water. The solution is applied to a photographic film as back layer which protects it from electric charge, scratching and halation.

This application is a continuation-in-part of our co-pending U. S. application Ser. No. 322,483 filed March 6, 1940.

We claim:

1. A photographic film comprising a support, a light sensitive silver halide emulsion layer and at least one auxiliary layer comprising an ester of cellulose with an acid having at least three carboxylic groups.

2. A photographic film comprising a support, a light-sensitive silver halide emulsion layer and at least one auxiliary layer substantially consisting of an esterification product prepared by condensing a hydrolyzed acetyl cellulose with the monomethylester anhydride of butane-$\alpha$-$\beta$-$\gamma$-$\delta$-tetracarboxylic acid.

3. A photographic film comprising a support, a light-sensitive silver halide emulsion layer and at least one auxiliary layer substantially consisting of the mixed cellulose ester with acetic acid and 2 - phenyl-1,3,4 - butanetricarboxylic acid monomethylester.

4. A photographic film comprising a support, a light-sensitive silver halide emulsion layer and at least one auxiliary layer comprising a mixed cellulose ester with acetic acid and the acid of the condensation of 2 molecules of abietic acid with 1 molecule of maleic acid anhydride.

ADOLF JUNG.
GUSTAV WILMANNS.